United States Patent
Zeiler et al.

(10) Patent No.: US 11,068,523 B1
(45) Date of Patent: *Jul. 20, 2021

(54) SYSTEMS AND METHODS FOR FACILITATING SEARCHING, LABELING, AND/OR FILTERING OF DIGITAL MEDIA ITEMS

(71) Applicant: CLARIFAI, INC., New York, NY (US)

(72) Inventors: Matthew D. Zeiler, New York, NY (US); Adam L. Berenzweig, Brooklyn, NY (US)

(73) Assignee: Clarifai, Inc., New York, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 16/277,145

(22) Filed: Feb. 15, 2019

Related U.S. Application Data

(63) Continuation of application No. 14/792,478, filed on Jul. 6, 2015, now Pat. No. 10,262,060.

(60) Provisional application No. 62/021,572, filed on Jul. 7, 2014.

(51) Int. Cl.
| | |
|---|---|
| *G06F 16/00* | (2019.01) |
| *G06F 7/00* | (2006.01) |
| *G06F 16/335* | (2019.01) |
| *G06F 16/338* | (2019.01) |

(52) U.S. Cl.
CPC .......... *G06F 16/335* (2019.01); *G06F 16/338* (2019.01)

(58) Field of Classification Search
CPC .... G06F 16/335; G06F 16/338; G06F 16/156; G06F 16/248; G06F 16/438; G06F 16/638; G06F 16/738; G06F 16/838; G06F 16/9038

USPC .......................................................... 707/722
See application file for complete search history.

(56) References Cited

U.S. PATENT DOCUMENTS

| | | | |
|---|---|---|---|
| 8,352,465 B1* | 1/2013 | Jing | G06F 16/54 |
| | | | 707/723 |
| 2002/0129033 A1 | 9/2002 | Hoxie et al. | |
| 2007/0005590 A1* | 1/2007 | Thrasher | G06F 16/338 |
| 2007/0136251 A1* | 6/2007 | Colledge | G06F 16/3322 |

(Continued)

OTHER PUBLICATIONS

Non-Final Office Action dated Mar. 19, 2018 in related U.S. Appl. No. 14/792,478, 30 pages.

(Continued)

*Primary Examiner* — Raquel Perez-Arroyo
(74) *Attorney, Agent, or Firm* — Pillsbury Winthrop Shaw Pittman LLP

(57) ABSTRACT

In certain embodiments, media item search and machine learning system training may be facilitated. In some embodiments, a first set of media items may be obtained (based on performance of a query) and presented on a user interface. A user selection of a media item of the first set may be obtained, and the query may be updated based on the user-selected media item. A second set of media items may be obtained based on performance of the updated query, and media items of the second set may be assigned to a group based on their similarities with one another. A predicted name for the group may be determined via a machine learning system and presented on the user interface. A user-indicated update to the predicted name for the group may be obtained and provided to the machine learning system to train the machine learning system.

20 Claims, 6 Drawing Sheets

(56) References Cited

U.S. PATENT DOCUMENTS

| | | | |
|---|---|---|---|
| 2012/0078936 A1* | 3/2012 | Kuo | G06F 16/3328 |
| | | | 707/766 |
| 2013/0282712 A1* | 10/2013 | Brandt | G06F 16/54 |
| | | | 707/731 |
| 2014/0122471 A1* | 5/2014 | Houston | G06F 16/958 |
| | | | 707/731 |
| 2017/0046427 A1 | 2/2017 | Tang et al. | |

OTHER PUBLICATIONS

Final Office Action dated Sep. 17, 2018 in related U.S. Appl. No. 14/792,478, 31 pages.
Notice of Allowance dated Dec. 28, 2018 in related U.S. Appl. No. 14/792,478, 9 pages.

* cited by examiner

Grid View

Multiscale Grid

Flower Petal View

Scatter View

Stack-and-Hover View

SYSTEMS AND METHODS FOR FACILITATING SEARCHING, LABELING, AND/OR FILTERING OF DIGITAL MEDIA ITEMS

CROSS-REFERENCE TO RELATED APPLICATIONS

This application is a continuation of U.S. patent application Ser. No. 14/792,478, filed Jul. 6, 2015, which claims the benefit of U.S. Provisional Application No. 62/021,572 filed on Jul. 7, 2014, the content of each of which is hereby incorporated herein by reference in its entirety.

FIELD OF THE DISCLOSURE

The present disclosure relates to systems and methods for facilitating searching, labeling, and/or filtering of digital media items, such as within one or more digital media item repositories.

BACKGROUND

Digital media item repositories are common across many businesses and/or personal collections. A digital media item may include one or more of a digital image, a video, an audio file, other non-text-based digital items, digital items that include text, and/or other digital media items. User-contributed collections may be used for some internet businesses. Users may perform searches to find, research, and/or otherwise browse through such collections. Keywords and/or textual metadata may be associated with individual digital media items. The keywords and/or other textual metadata may be indexed for searching purposes. In some contexts, there may be little to no associated keywords or textual metadata associated with individual digital media items. It may be difficult and/or tedious for a user to describe in words a digital media item he or she seeks.

SUMMARY

One aspect of the disclosure relates to a system configured for facilitating searching, labeling, and/or filtering of digital media items. A digital media item may include one or more of a digital image, a video, an audio file, other non-text-based digital items, digital items that include text, and/or other digital media items. One or more components of the system may be configured to obtain one or more queries from one or more users and perform a search for digital media items that satisfy the queries. Results from the search may be presented to the users. A user may provide selection of one or more displayed digital media items. A user selection may provide an image exemplar that may be used to update the user-provided queries. Context information may be obtained for the user-selected digital media items. The context information may be used to generate an updated query and perform further searches for digital media items based on the updated query. As such, in some implementations, a repository of digital media items may be queried both with the original text query supplied by a user and context information of user-selected digital media items returned from the original text query. Thus, a user may be able to refine an initial text query without having to know additional search terms.

In some implementations, individual digital media items and/or groups of digital media items may be associated with context information and/or other information. Context information may include one or more of a category of a digital media item, a geolocation, a timestamp, a price, a semantic description, a content description, a rating, and/or other information associated with a given digital media item that may provide context for a digital media item. Context information associated with individual ones of the digital media items may be referred to as a "label," "tag," and/or other terms. An association of context information to individual ones of the digital media items may be referred to as "labeling," "tagging," and/or other terms. Context information associated with a digital media item may be stored as metadata of the digital media item and/or associated with the digital media item in other ways. In some implementations, context information may be generated for a given digital media item based on one or more of a prediction of the context information, user-provided information, and/or other techniques.

In some implementations, the system may comprise one or more physical processors configured by machine-readable instructions. Executing the machine-readable instructions may cause the one or more physical processors to facilitate searching for digital media items within one or more digital media item repositories. The machine-readable instructions may include one or more of a query component, a search component, a results component, a selection component, a label component, and/or other components.

In some implementations, the query component may be configured to facilitate one or more of obtaining queries for digital media items, updating queries, and/or performing one or more other operations. In some implementations, queries may be obtained from computing platforms associated with users of the system and/or other sources. By way of non-limiting example, users may submit queries via one or more input devices of a computing platform. The query component may be configured to obtain a first query for digital media items and/or other queries.

The query component may be configured to update the obtained queries based on a user selection of one or more digital media items that may be presented to the user. Updating an obtained query may include one or more of replacing the obtained query with a new query, adding one or more terms to the obtained query, removing one or more terms from the obtained query, and/or other types of updates.

In some implementations, the search component may be configured to perform searches within one or more digital media item repositories for one or more digital media items that satisfy the obtained queries and/or updated queries. By way of non-limiting example, the search component may be configured to perform a first search and/or other searches within a first digital media item repository and/or other digital media item repositories for one or more digital media items that satisfy the obtained first query and/or other queries.

The results component may be configured to effectuate presentation of sets of digital media items that satisfy the obtained queries and/or updated queries via computing platforms associated with users. By way of non-limiting example, responsive to the first search returning a first set and/or other sets of digital media items that satisfy the first query, the first set and/or other sets of digital media items may be presented on a first computing platform.

The selection component may be configured to obtain a user selection of one or more digital media items in the presented sets of digital media items. By way of non-limiting example, the selection component may be configured to receive a first user selection of a first digital media item included in the first set of digital media items presented on the first computing platform. The query component may be configured to update the first query based on the first user selection of the first digital media item. The search component may be configured to perform a second search and/or other searches within the first digital media item repository and/or other digital media item repositories for one or more digital media items that satisfy the updated first query.

In some implementations, the label component may be configured to obtain user selection from the users of a modification to the context information that is presented with the digital media items of a given group, such that a first modification to the presented first context information is entered and/or selected by the first user; and/or update context information that is associated with individual digital media items of a given group based on the modifications to the context information that is presented with the digital media items of the given group, such that the first context information associated with the second digital media item is updated based on the first modification to the first context information presented with the digital media items of the first group.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a", "an", and "the" include plural referents unless the context clearly dictates otherwise.

DETAILED DESCRIPTION

Figure 1:
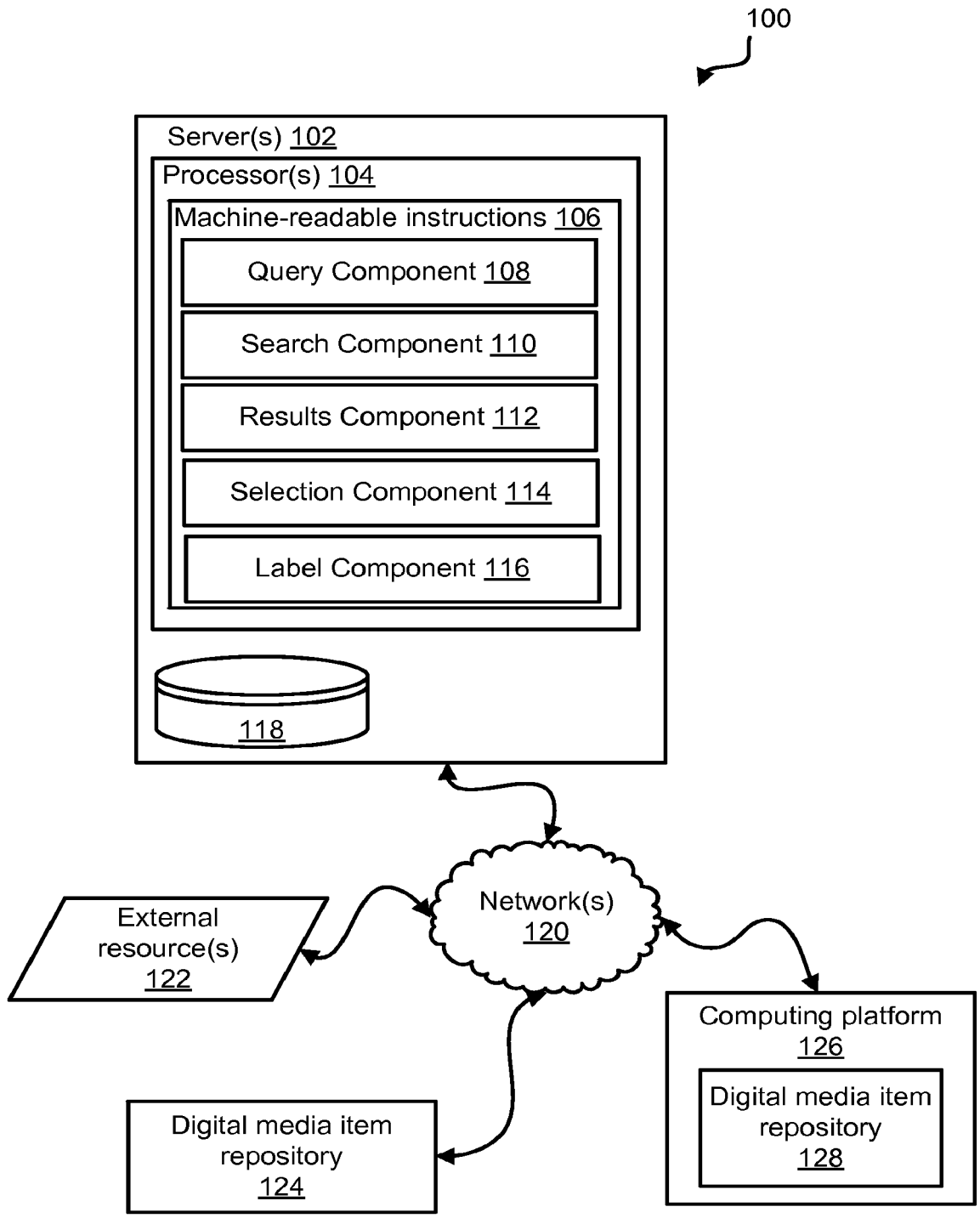
FIG. 1 illustrates a system configured for facilitating searching, labeling, and/or filtering of digital media items, in accordance with one or more implementations.

FIG. 1 illustrates a system 100 configured for facilitating searching, labeling, and/or filtering of digital media items, in accordance with one or more implementations. A given digital media item may include one or more of an image, a video, an audio file, financial data, time series information, pricing data, binary data, and/or other digital media items.

In some implementations, individual digital media items and/or groups of digital media items may be associated with context information and/or other information. Context information may include one or more of a category of a digital media item, a geolocation, a timestamp, a price, a semantic description, a representation of the digital media item in visual-semantic embedding space, a content description, a rating, a user review, a device footprint, and/or other information associated with a given digital media item that may provide context and/or other information for a digital media item. Context information associated with individual ones of the digital media items may be referred to as a "label," "tag," "class," "category," "concept," "metadata," and/or other terms. An association of context information to individual ones of the digital media items may be referred to as "labeling," "tagging," "classifying," "categorizing," "recognizing," and/or other terms. Context information associated with a digital media item may be stored as metadata of the digital media item and/or associated with the digital media item in other ways.

In some implementations, context information may be generated for a given digital media item based on one or more of a prediction of the context information, user-provided information, and/or other techniques. By way of non-limiting illustration in FIG. 5, an exemplary context information determination and/or indexing system 500 is shown. System 500 may include one or more physical processors 504 configured by machine-readable instructions (not shown in FIG. 5), indexes 506, and/or other components. Executing the machine-readable instructions may cause one or more physical processors 504 to facilitate one or more of predicting context information for individual digital media items, indexing the context information within one or more indexes 506 to facilitate searching of the digital media items, and/or other operations. In some implementations, indexes 506 may comprise one or more rational databases of information that provide a basis against which searches for digital media items may be performed in order to retrieve a desired digital media item. The machine-readable instructions of one or more physical processors 504 may include one or more of a tag component 508, an embeddings component 510, a quality component 512, a filtering component 514, and/or other components.

In some implementations, the tag component 508 may be configured to obtain digital media items in the repository 502. Tag component 508 may be configured to predict text-based context information to associate with individual ones of the digital media items. By way of non-limiting example, the tag component 508 may comprise a machine learning system that may have been previously trained to predict context information. In some implementations, predicted text-based context information may be stored in a text index 305. Text index 305 may comprise, for example, a data structure stored within electronic storage (not shown in FIG. 5) of system 500 and/or other components.

In some implementations, embeddings component 510 may be configured to determine embeddings for individual ones of the digital media items of digital media item repository 502.

In some implementations, embeddings may be associated with a similarity (or dissimilarity) between digital media items, and/or other information. By way of non-limiting example, similarity between two or more digital media items may be determined based on a "distance" between two points that represent individual digital media items in an "embedding" space and/or other representative space. By way of non-limiting example, representative points may be portrayed as "closer" together in the space if corresponding digital media items are relatively more similar. By way of non-limiting example, a representative space may comprise a visual-semantic embedding space and/or other representative space. A visual-semantic representative space may facilitate a mapping from digital media items to points in the representative space. By way of non-limiting example, a metric space, token-based feature space, hashing space, mapping space, semantic space, and/or type of visual-semantic embedding space may be employed.

In some implementations, distances between representative points may be computed to determine similarities of the digital media items associated with the points. A compact description of individual digital media items may be computed to map semantically similar digital media items to nearby points in the space. By way of non-limiting example, a compact description may be determined by a machine learning system that may have been trained for the desired tasks. By way of non-limiting illustration, digital media items comprising images of "dogs" may be represented as being closer together with other images of "dogs" within the space; digital media items comprising images of "dogs of the same breed" may be even closer within the space; digital media items comprising images of "dogs" may be represented as being closer to images of "cats" than to images of "cars"; and/or other representations may be made within a visual-semantic embedding space. It is noted that the above examples of digital media items comprising images of "dogs," "cats", and/or "cars" is provided for illustrative purposes only and is not to be considered limiting. For example, in some implementations, embeddings and/or similarity may be determined for other types and/or content of digital media items.

In some implementations, one or more embeddings determined by embeddings component 510 may be stored in an embedding index 306. Embedding index 306 may comprise, for example, a data structure stored within electronic storage (not shown in FIG. 5) of system 500 and/or other components. Embedding index 306 may be configured to provide one or more of a high-dimensional approximate near-neighbor vector indexing system, token based lookup, hash tables, and/or other indexing systems.

In some implementations, quality component 512 may be configured to determine values for one or more quality parameters for one or more digital media items. The determined values may provide a query-independent subjective quality measure for individual ones of the digital media items. By way of non-limiting example, a quality measure may facilitate distinguishing a relatively high-quality digital media item from a relatively low-quality digital media item. Values for a quality parameter may be determined based on one or more of a visual quality, audio quality, interaction rank, and/or other quality measure. By way of non-limiting example, a visual quality may be determined based on one or more visual aspects of a given digital media item. A visual aspect may correspond to one or more of an image artifact, distortion, blurriness, lighting, composition, and/or other visual aspects of a given digital media item. An audio quality may be determined based on one or more of an audible distortion being present in an audio track of a given digital media item, the encoding quality, and/or other audio-related qualities. An interaction rank may be associated with one or more of a "click log" associated with the digital media item (e.g., an amount of human interactions with the given digital media item, and/or other information); an amount of social media "likes," popularity, comments, shares, and/or other social media interactions and/or metrics; and/or other information.

In some implementations, the filter component 514 may be configured to filter digital media items for unwanted content. Unwanted content may include one or more of content that may be offensive, inappropriate for children, copyright-infringing, and/or other types of content. Filter component 514 may be configured to associate filter information with individual digital media items. Filter information may convey whether the digital media item is "unwanted content," "allowable content," and/or associated with other types of content. Determined values of quality parameters and/or filtering information may be stored in quality/filter index 307 and/or other storage location.

Figure 5:
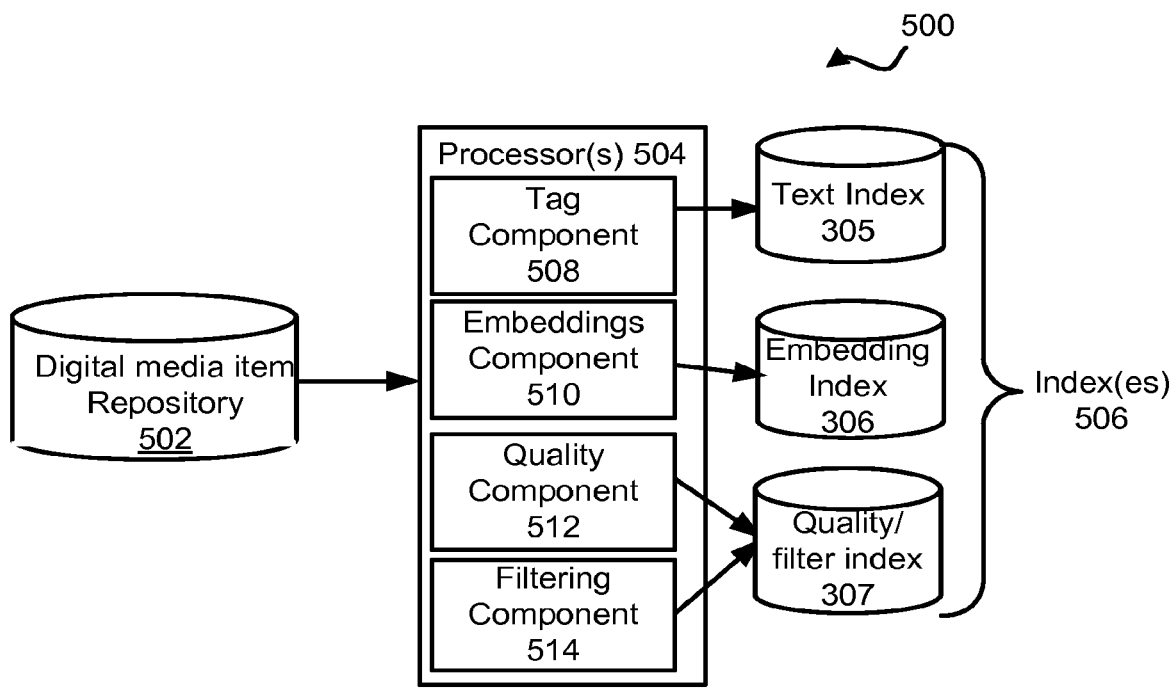
FIG. 5 illustrates a context information prediction and indexing system, in accordance with one or more implementations.

It is noted that the system 500 of FIG. 5 is provided for illustrative purposes only and is not to be considered limiting. By way of non-limiting example, other exemplary systems and/or methods for associating context information with a digital media item may include, but are not limited to, those described in one or both of U.S. Provisional Application No. 62/106,648, titled "User Interface for Context Labeling of Multimedia Items," and/or U.S. Provisional Application No. 62/084,506, titled "User Interface for Labeling, Browsing, And Searching Semantic Labels Within Video," each of which is incorporated herein by reference in its entirety.

Returning to FIG. 1, in some implementations, the system 100 may comprise one or more servers 102, one or more networks 120, one or more external resources 122, one or more digital media item repositories 124, one or more computing platforms 126, and/or other components. Server 102 may include one or more physical processors 104 configured by machine-readable instructions 106. Executing machine-readable instructions 106 may cause one or more physical processors 104 to facilitate searching for digital media items within one or more digital media item repositories. Machine-readable instructions 106 may include one or more of a query component 108, a search component 110, a results component 112, a selection component 114, a label component 116, and/or other components.

In some implementations, server 102 may be configured to provide remote hosting of one or more features and/or functions of machine-readable instructions 106 to one or more computing platforms 126 that may be remotely located from server 102. In some implementations, one or more features and/or functions of server 102 may be attributed to local features and/or functions of one or more computing platforms 126. By way of non-limiting example, individual ones of the computing platforms 126 may include machine-readable instructions comprising the same or similar components as machine-readable instructions 106 of server 102. Computing platforms 126 may be configured to locally execute the one or more components that may be the same or similar to machine-readable instructions 106.

Computing platforms 126 may include one or more of a cellular telephone, a smartphone, a laptop, a tablet computer, a desktop computer, a television set-top box, smart TV, a gaming console, and/or other computing platforms. A given computing platform 126 may include a local digital media item repository 128 and/or other components.

In some implementations, digital media items may be stored in one or more of electronic storage 118 of server 102, one or more external resources 122, a remote digital media item repository 124 accessible by server 102, and/or computing platforms 126 via network 120, a digital media item repository 128 local to a given computing platform 126, and/or other storage locations. By way of non-limiting example, digital media item repository 124 may comprise one or more of a third-party electronic storage location for digital media items, and/or other type of remote digital media item repository configured to store digital media items. In some implementations, digital media item repository 128 of a given computing platform 126 may be incorporated as part of local electronic storage of given computing platform 126.

In some implementations, query component 108 may be configured to facilitate one or more of obtaining queries for digital media items, updating queries, and/or performing one or more other operations. In some implementations, queries may be obtained from one or more computing platforms 126 associated with one or more users of system 100 and/or from other sources. By way of non-limiting example, a given user may submit one or more queries via a given computing platform 126. Computing platforms 126 may include one or more input devices configured to facilitate user input of a query and/or other information. An input device may include one or more of a keyboard, a touchscreen, a microphone, a camera, and/or other input devices.

One or more computing platforms 126 may be configured to effectuate presentation of one or more user interfaces. A given user interface may include one or more user interface elements. A user interface element may include one or more of an input element, a navigation element, a display element, and/or other elements. An input element may be configured to receive entry and/or selection of user input via one or more input devices of computing platform 126. An input element may comprise one or more of a text-input field, a drop-down list, a list box, a checkbox, a search field, a button, and/or other input elements. A navigation element may be configured to facilitate navigating between different pages, views, and/or other parts of a user interface. A navigation element may include one or more of a breadcrumb, a slider, pagination, a page, a tab, an icon, an image carousel, and/or other navigation elements. A display element may be configured to present information to a user via the user interface. A display element may include one or more of a window, a results display area, and/or other components.

A given user interface element may be configured to receive user input of one or more queries and/or other information. A query may include one or more of a text-based query, an image-based query, and/or other types of queries. An image-based query may include entry and/or selection of an image exemplar and/or other information. By way of non-limiting illustration in FIG. 6, an exemplary user interface 600 is shown. The user interface 600 may include one or more user interface elements. The one or more user interface elements may include one or more of a first input element 602, a first display element 604, a second input element 606, and/or other user interface elements. First input element 602 and/or other input elements may include a text input field and/or other type of input element. First input element 602 and/or other input elements may be configured to receive user input of one or more text-based and/or digital-media-item-based queries. By way of non-limiting example, a user may type a text-based query into first input element 602. In some implementations, a user may enter a digital media item as a query by one or more of uploading first input element 602, performing a "drag and drop" input into the first input element 602, and/or by other techniques.

Figure 2:
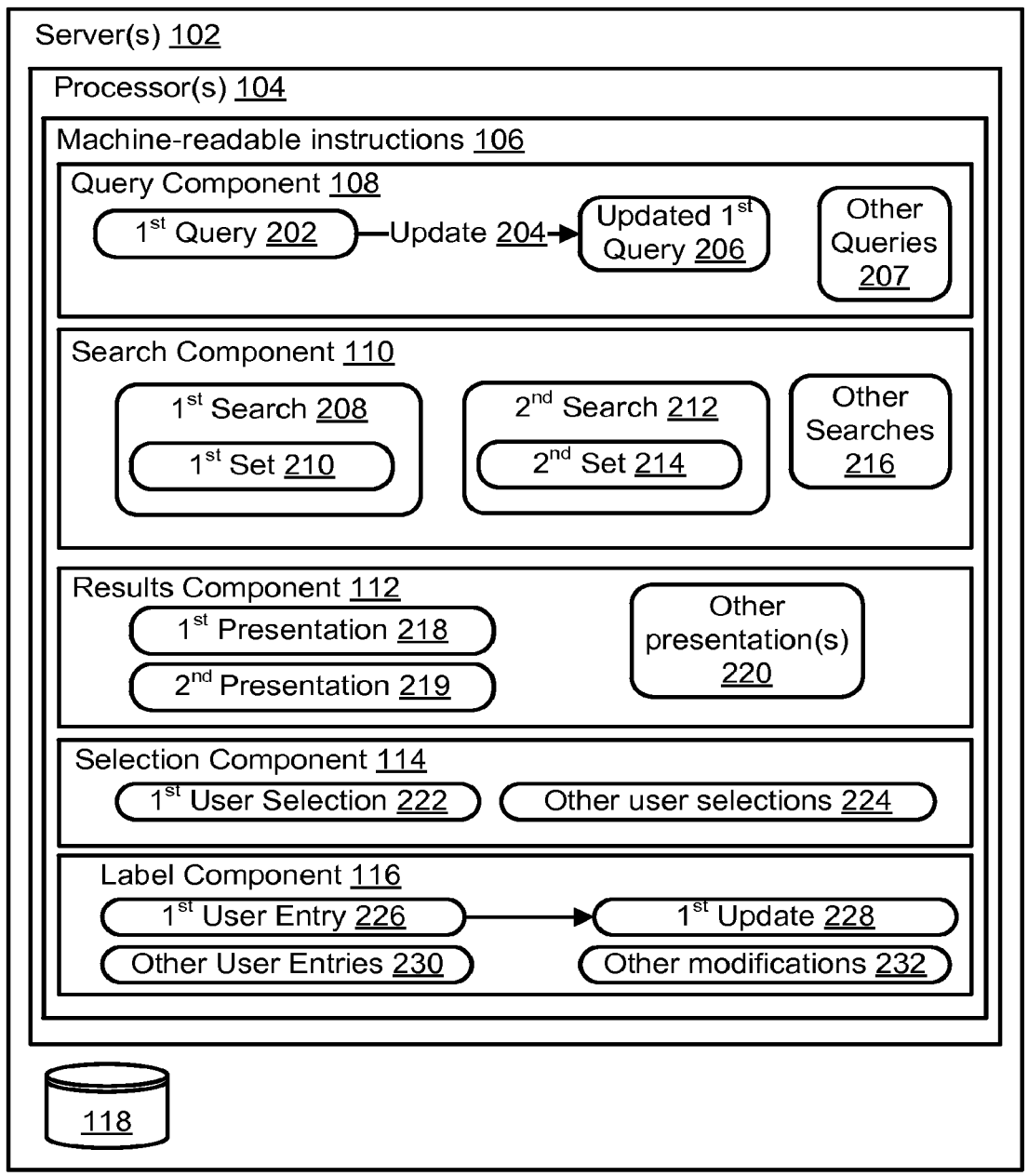
FIG. 2 illustrates an exemplary server used in the system of FIG. 1, in accordance with one or more implementations.

By way of non-limiting illustration in FIG. 2, query component 108 may be configured to obtain a first query 202. The first query 202 may be associated with input by a first user via a first computing platform associated with the first user (not shown in FIG. 2).

Returning to FIG. 1, search component 110 may be configured to perform one or more searches within one or more digital media item repositories for one or more digital media items that satisfy one or more obtained queries and/or other queries (e.g., updated queries, described herein). In some implementations, searches may be performed by querying one or more indexes associated with a digital media item repository (e.g., indexes 506 in FIG. 5) and/or other by other techniques.

Figure 4:
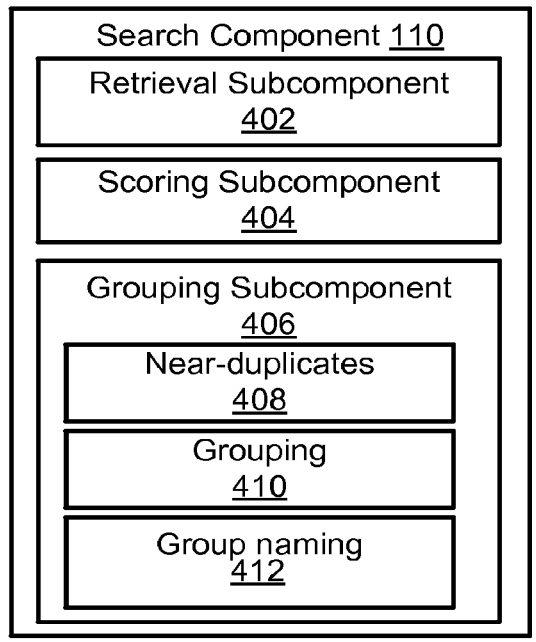
FIG. 4 illustrates an exemplary implementation of a search component of machine-readable instructions in the system of FIG. 1.

FIG. 4 illustrates an exemplary implementation of search component 110 being configured to perform one or more searches within one or more digital media item repositories for one or more digital media items that satisfy one or more queries. In some implementations, performing a given search may include one or more of retrieving one or more digital media items from one or more digital media item repositories that satisfy one or more queries, determining similarity between individual digital media items, grouping one or more digital media items together based on similarity, and/or other operations.

In some implementations, search component 110 may comprise one or more subcomponents. The subcomponents may comprise one or more of a retrieval subcomponent 402, a scoring subcomponent 404, a grouping subcomponent 406, and/or other components.

In some implementations, retrieval subcomponent 402 may be configured to retrieve one or more digital media items and/or other information. In some implementations, retrieving one or more digital media items may comprise utilizing one or more of a text-based retrieval technique (e.g., for text-based queries), an image-based retrieval technique (e.g., for image-based queries), and/or other retrieval techniques to retrieve one or more digital media items that satisfy one or more queries. By way of non-limiting example, in some implementations, a text query may be utilized to retrieve one or more sets of digital media items that satisfy terms of the text query.

In some implementations, for an image-based query, the search component 110 may be configured to obtain context information of a user-provided image exemplar (e.g., if such information is present with the image) and/or generate predicted context information (e.g., text, embeddings, and/or other information) for the image exemplar. Text-based context information of the image-based query may be converted into terms of a text query. The text query may be used to retrieve one or more sets of digital media items based on the one or more digital media items satisfying the terms of the text query. In some implementations, embeddings-type context information may be used to query a near-neighbor indexing system to retrieve one or more sets of digital media items (e.g., using the same or similar components as system 500 shown in FIG. 5 and described herein).

In some implementations, scoring subcomponent 404 may be configured to determine a similarly between individual digital media items. In some implementations, similarly may correspond to one or both of semantic similarity, visual similarity, and/or other types of similarity. Similarity may be based on determining one or more similarity scores between individual digital media items and/or by other techniques. Similarity scores may be determined based on one or more of a comparison of context information of retrieved digital media items and/or other techniques.

In some implementations, a similarity score may be a numeric score and/or other representation of a score that may represent a degree, percentage, and/or other measure of similarity between at least two digital media items. In some implementations, a similarly score may be determined based on an amount and/or fraction of matching context information and/or other matching information associated with the digital media items, a qualitative comparison of individual features of digital media items, and/or other techniques. In some implementations, similarity scores may be normalized.

In some implementations, the grouping subcomponent 406 may be configured to assign one or more digital media items to a given group based on similarity scores and/or other information. Grouping one or more digital media items may comprise one or more of determining duplicates and/or near-duplicates 408 of digital media items based on similarly scores, grouping 410 other non-duplicate digital media items based on similarity scores, determining a name 412 of a given group, and/or other operations.

In some implementations, duplicates and/or near-duplicates may be determined based on a similarity score threshold that may convey that at least two digital media item may be duplicates and/or near-duplicates. By way of non-limiting example, digital media items that may exhibit similarity scores above a given threshold may be considered duplicates and/or near-duplicates of each other. By way of non-limiting example, two or more digital media item that may exhibit a similarity score of 95%, and/or other percentage and/or degree of similarly, may be considered duplicates and/or near-duplicates.

Assigning digital media items to groups may be based on assigning semantically and/or visually similar digital media items to common groups. By way of non-limiting example, similarity scores of digital media items with a given value and/or range of values may convey that the digital media items may be semantically and/or visually similar. Digital media items with similarity scores of the given value and/or range may be assigned to the same group, while digital media items having similarity scores of another given value and/or range of values may be assigned to different groups. By way of non-limiting example, digital media items determined to be in the range of 55-95% similar may be assigned to a given group, while digital media items determined to be below 55% similar may be assigned to different groups.

In some implementations, within a visual-semantic embedding space, for individual digital media items of a given group, a centrality score may further be determined. A centrality score may be a function of a distance of a digital media item from a group center represented in an embedding space. By way of non-limiting example, a group center may comprise a central digital media item that may be most representative of the group within the embedding space.

In some implementations, individual groups may be assigned predicted names. Predicted names may be determined by one or more of an aggregate of context information of the digital media items within the group (e.g., predicted and/or previously associated context information that may be commonly shared between the digital media items), a weighting by representativeness (e.g., distance from the group center in the embedding space), and/or other information.

By way of non-limiting illustration in FIG. 2, search component 110 may be configured to perform a first search 208, second search 212, and/or other searches 216 within one or more digital media item repositories. The first search 208 may be associated with the first query 202. The first search may be performed within a first digital media item repository (not shown in FIG. 2) for one or more digital media items that satisfy the first query 202.

In some implementations, performing the first search 208 may comprise one or more of retrieving a first set 210 of digital media items from the first digital media item repository that satisfy the first query 202, assigning digital media items included in the first set 210 of digital media items into groups, and/or other operations. In some implementations, assigning digital media items of the first set 210 into groups may comprise one or more of obtaining context information associated with individual ones of the digital media items included in the first set 210, assigning digital media items included in the first set 210 into individual groups based on common context information shared between digital media items, and/or other operations. By way of non-limiting example, the first set 210 may include a first digital media item (not shown in FIG. 2). The first digital media item may be associated with first context information. The first digital media item may be assigned to a first group based on the first context information being common between the first digital media item and one or more other digital media items of the first group.

Returning to FIG. 1, the results component 112 may be configured to facilitate one or more of obtaining sets of digital media items and/or representations (e.g., copies) of digital media items that satisfy the obtained queries, effectuating presentation of sets of digital media items on computing platforms 126 associated with users, and/or other operations. In some implementations, the results component 112 may be configured to obtain digital media items and/or representations of digital media items from one or both of search component 110 and/or directly from one or more digital media item repositories.

Effectuating presentation of sets of digital media items that satisfy the obtained queries may comprise communicating views of the digital media items to user interfaces presented on displays of computing platforms 126. In some implementations, digital media items within a given set of digital media items may be presented based on their respective assigned groups (e.g., as illustrated in FIGS. 7-11 and described herein). In some implementations, predicted group names may be presented along with the digital media items.

Figure 6:
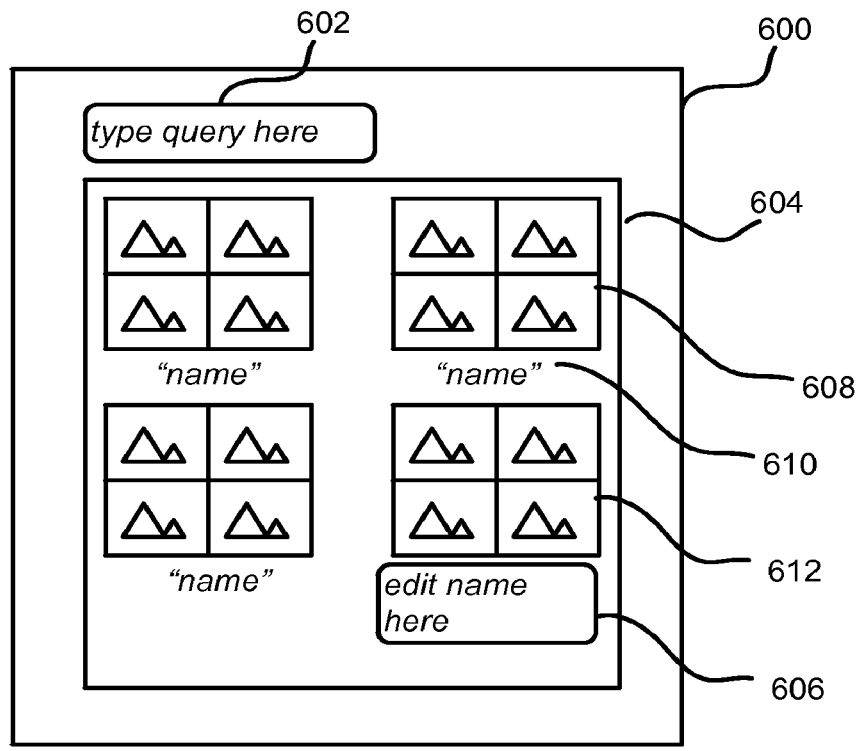
FIG. 6 illustrates an exemplary user interface, in accordance with one or more implementations.

By way of non-limiting illustration in FIG. 6, the first display element 604 of user interface 600 may be configured to present views of digital media items of a set of digital media items. The first display element 604 may display one or more groups of digital media items included in a set of digital media items returned from a query search. The one or more groups may include a first group 608, a second group 612, and/or other groups. A predicted first name 610 of the first group 608 may be presented along with the display of the first group 608. It is noted that individual ones of the groups of digital media items may be displayed in accordance with one or more display views (shown in FIGS. 7-11 and described herein).

FIGS. 7-11 illustrate various display views for presenting groups of digital media items.

Figure 7:
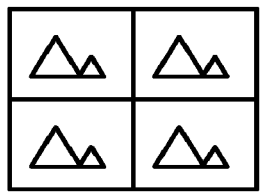
FIG. 7 illustrates an exemplary display view for presenting digital media items in a user interface.

FIG. 7 illustrates a first display view comprising a grid view. The grid view may comprise one or more digital media items of substantially the same size being disposed and arranged in a grid as shown in the figure.

Figure 8:
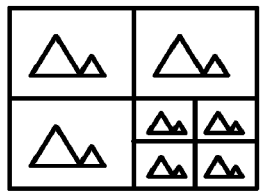
FIG. 8 illustrates another exemplary display view for presenting digital media items in a user interface.

FIG. 8 illustrates a second display view comprising a multiscale grid view. The multiscale grid view may comprise one or more digital media items wherein at least some of the digital media items may be portrayed relatively larger than other ones of the digital media items. One or more digital media items that may be larger than other ones of the digital media items may represent digital media items that may be most representative of the group with which they are associated (e.g., corresponding to a most central representative point in a visual-semantic embedding space).

Figure 9:
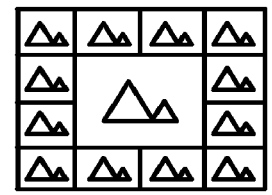
FIG. 9 illustrates yet another exemplary display view for presenting digital media items in a user interface.

FIG. 9 illustrates a third display view comprising a flower petal grid view. The flower petal view may comprise one or more digital media items wherein at least some of the digital media items may be portrayed relatively larger than other ones of the digital media items. One or more digital media items that may be larger than other ones of the digital media items may represent digital media items that may be most representative of the group with which they are associated (e.g., corresponding to a most central representative point in a visual-semantic embedding space).

Figure 10:
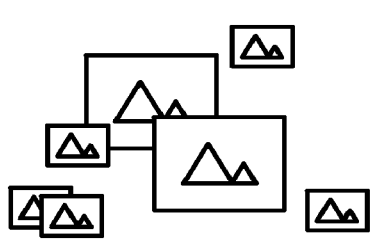
FIG. 10 illustrates yet another exemplary display view for presenting digital media items in a user interface.

FIG. 10 illustrates a fourth display view comprising a scatter view. The scatter view may comprise one or more digital media items wherein at least some of the digital media items may be portrayed relatively larger than other ones of the digital media items. The digital media items may be scattered throughout a display element of a user interface. One or more digital media items that may be larger than other ones of the digital media items may represent digital media items that may be most representative of the group with which they are associated (e.g., corresponding to a most central representative point in a visual-semantic embedding space).

Figure 11:
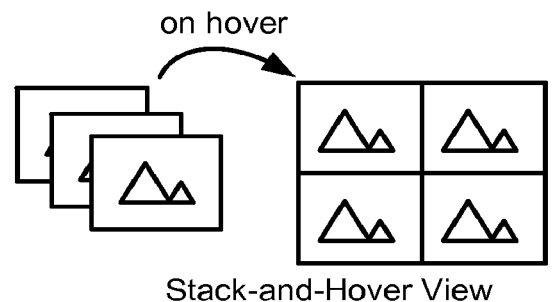
FIG. 11 illustrates yet another exemplary display view for presenting digital media items in a user interface.

FIG. 11 illustrates a fifth display view comprising a stack-and-hover view. The stack-and-hover view may comprise one or more digital media items overlaid in stack arrangement (e.g., left-hand side of the figure). When a user controls a cursor over the stack arrangement (e.g., hovers the cursor over the stack), the stack may change to one or more other display views (e.g., right-hand side of the figure). The one or more other display views may comprise one or more of a grid view, a multiscale grid view, a flower petal view, a scatter view, a stack-and-hover view, a stacked view, a single media item view, and/or other display view.

By way of non-limiting illustration in FIG. 2, the results component 112 may be configured to effectuate a first presentation 218 of the first set 210 of digital media items on a first computing platform, and/or other presentations 220 of other sets of digital media items on one or more other computing platforms. In some implementations, the results component 112 may be configured to effectuate presentation of individual ones of the digital media items of the first set 210 and/or other sets of digital media items based on their respective assigned groups. By way of non-limiting example, presenting individual ones of the digital media items of a set of digital media items based on their respective assigned groups may comprise presenting digital media items of a given group using one or more of a grid view, multiscale grid view, flower petal view, scatter view, stack-and-hover view, and/or other display views.

Returning to FIG. 1, the selection component 114 may be configured to obtain user selection of one or more digital media items in the presented sets of digital media items, and/or other information. In some implementations, user selection of one or more digital media items may facilitate updating one or more user-provided queries (e.g., via query component 108). User selection may be facilitated by user input via one or more input devices of a computing platform 126 associated with the user.

By way of non-limiting illustration in FIG. 2, selection component 114 may be configured to obtain first user selection 222 of a first digital media item included in first set 210 of digital media items by the first user via the first computing platform, and/or other user selections 224.

Returning to FIG. 1, query component 108 may be configured to update obtained queries based on user selections of one or more digital media items presented to the users. In some implementations, updating a given query may comprise one or more of adding terms to the query, removing terms from the query, replacing the query with a new query, and/or other techniques.

In some implementations, updating a given query by adding terms to the query may comprise one or more of obtaining context information associated with individual ones of the user-selected one or more digital media items, determining text-based terms from the context information, adding the determined text-based terms to the query, and/or other operations. By way of non-limiting example, updating a first query based on a user selection of a first digital media item may comprise one or more of obtaining first context information of the first digital media item, determining a first textual term from the first context information, adding the first textual term to text of the first query, and/or other operations.

In some implementations, updating a given query by replacing the query with a new query may comprise one or more of obtaining context information associated with individual ones of the one or more user-selected digital media items, determining text-based terms from the context information, providing the determined text-based terms as a new query, and/or other operations. By way of non-limiting example, updating a first query based on a user selection of a first digital media item may comprise one or more of obtaining first context information of the first digital media item, determining a first textual term from the first context information, providing the first textual term as a term of a second query, and/or other operations.

By way of non-limiting illustration in FIG. 2, query component 108 may be configured to update 204 first query 202 and/or other queries 207. Updating 204 the first query 202 may provide an updated first query 206. The update 204 may be based on first user selection 222 of the first digital media item included in first set 210 of digital media items presented on the first computing platform.

In some implementations, updating 204 first query 202 may comprise one or more of obtaining first context information associated with first user selection 222 of the first digital media item, updating first query 202 by adding text-based terms of the first context information in first query 202, updating first query 202 by replacing first query 202 with a second query that comprises the textual terms of first context information, and/or other operations.

Returning to FIG. 1, search component 110 may be configured to perform one or more searches within one or more digital media item repositories for one or more digital media items that satisfy one or more updated queries. By way of non-limiting example, search component 110 may be configured to retrieve one or more other sets of digital media items that satisfy a given updated query.

By way of non-limiting illustration in FIG. 2, the search component 110 may be configured to perform a second search 212 within the first digital media item repository and/or other digital media item repositories for one or more digital media items that satisfy updated first query 206. By way of non-limiting example, search component 110 may be configured to retrieve a second set 214 of digital media items based on the second search 212. The second set 214 may comprise one or more digital media items not included in the first set 210.

Returning to FIG. 1, results component 112 may be configured to facilitate one or more of obtaining sets of digital media items and/or representations (e.g., copies) of digital media items that satisfy the updated queries, effectuating presentation of sets of digital media items that satisfy the updated queries on computing platforms 126 associated with users, and/or other operations.

By way of non-limiting illustration in FIG. 2, results component 112 may be configured to effectuate a second presentation 219 of second set 214 of digital media items and/or other digital media items on the first computing platform. In some implementations, effectuating second presentation 219 may further comprise effectuating presentation of context information that may be commonly shared between digital media items of a given group of digital media items of second set 214 (e.g., an assigned group name) with the presentation of the digital media items of the given group.

Returning to FIG. 1, the label component may be configured to facilitate one or more of obtaining user entry of context information for one or more digital media items and/or groups of digital media items, updating current context information of the one or more digital media items and/or groups of digital media items based on the user-entered context information, and/or other operations. In some implementations, updates to context information may include one or more of adding information to currently present context information, removing information from the currently present context information, replacing information in the currently present context information, and/or other modification techniques. In some implementations, updating context information may facilitate allowing the updated context information to be used for indexing context information of a given digital media item such that the updated context information may now be used as a search term.

By way of non-limiting illustration in FIG. 6, second input element 606 of user interface 600 may comprise a text input field and/or other input element. Second input element 606 may be associated with a displayed assigned name of the second group 612 of digital media items. The second input element 606 may be configured to receive user entry of context information. The user entry may facilitate one or more of changing the assigned name given to the second group 612, adding the user-entered context information to the existing context information of the digital media items included in the second group 612, replacing existing context information of the digital media items included in the second group 612 with the user-entered context information, and/or other operations. In some implementations, updating context information may be referred to as "training" one or more components of the system 100 to "learn" the user-entered context information.

By way of non-limiting illustration in FIG. 2, the label component 116 may be configured to obtain a first user entry 226 and/or other user entries 230 of context information. By way of non-limiting example, the first user entry 226 may be provided in association with a presented assigned name of a group of digital media items presented on a computing platform associated with a user performing a search and/or provided via one or more other text input elements of a user interface. The label component 116 may be configured to provide a first update 228 and/or other updates 232 of first context information associated with a first digital media item and/or other digital media items based on the first user entry 226 and/or other user entries 230.

Figure 12:
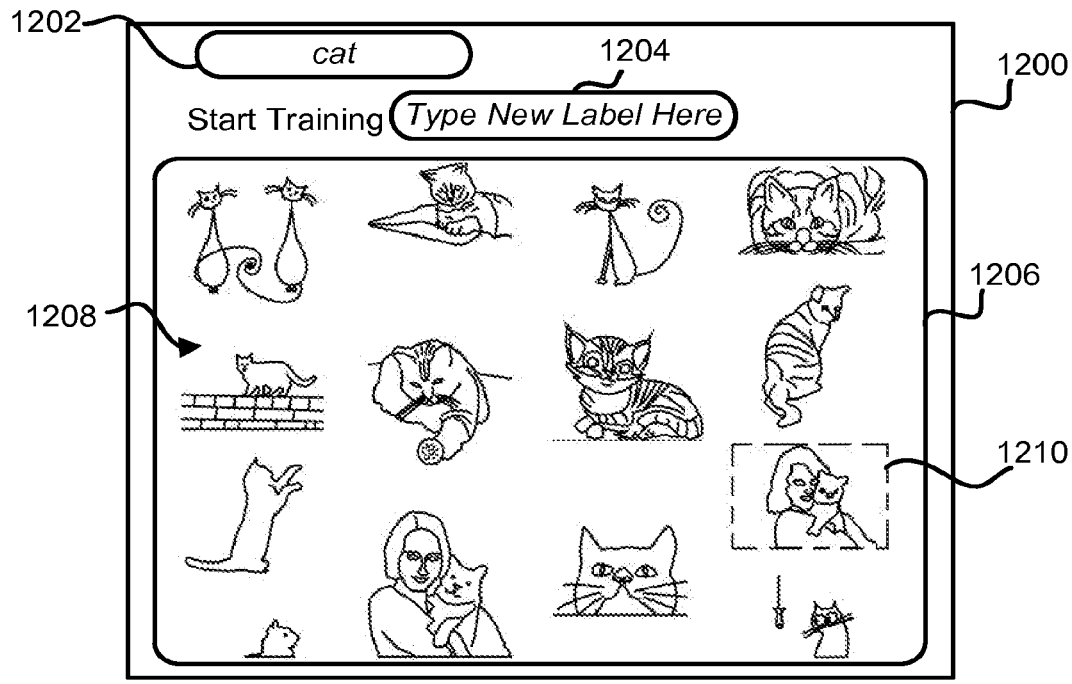
FIG. 12 illustrates an exemplary implementation of a user interface.

FIG. 12 illustrates an exemplary implementation of a user interface 1200 configured for presentation on a display of a computing platform associated with a user of a system configured to facilitate searching for digital media items within one or more digital media item repositories (e.g., system 100 in FIG. 1, described herein). The user interface 1200 may include one or more user interface elements. The one or more user interface elements may comprise one or more of a first input element 1202, a second input element 1204, a first display element 1206, and/or other user interface elements. The first input element 1202 may be configured to receive user input of one or more of text-based queries, image-based queries, and/or other types of queries.

By way of non-limiting example, a first query comprising the term "cat" is illustrated. The first display element 1206 may be configured to effectuate presentation of one or more sets of digital media items that satisfy the first query. By way of non-limiting example, a first set 1208 of digital media items (e.g., images) is shown within the first display element 1206. The first set 1208 may comprise digital media items that satisfy the first query, "cat." It is noted that such a query may be likely to return results of a wide variety of digital media items associated with context information having the term "cat." By way of non-limiting example, digital media items comprising images may include images of one or more of house cats, wild cats, drawings of cartoon cats, people holding cats, and/or other types of images.

The first display element 1206 may be configured to receive user selection of one or more digital media items within the first set 1208 of digital media items to allow the user to refine the first query. By way of non-limiting example, a user may select a first digital media item 1210 and/or other digital media items (e.g., the selection being shown by the dashed-line box around the digital media item 1210). Based on the user selection, the first query may be updated (e.g., in accordance with one or more of the selection component 114, query component 108, and/or other components of machine-readable instruction 106 shown in FIG. 1 and described herein). By way of non-limiting example, the first query may be updated based on context information associated with the first digital media item 1210. As an illustrative example, the first digital media item 1210 may be associated with descriptive context information including one or more of "person holding animal," and/or other information. The first query may be updated to include terms such as "cat" and "person holding animal."

Figure 13:
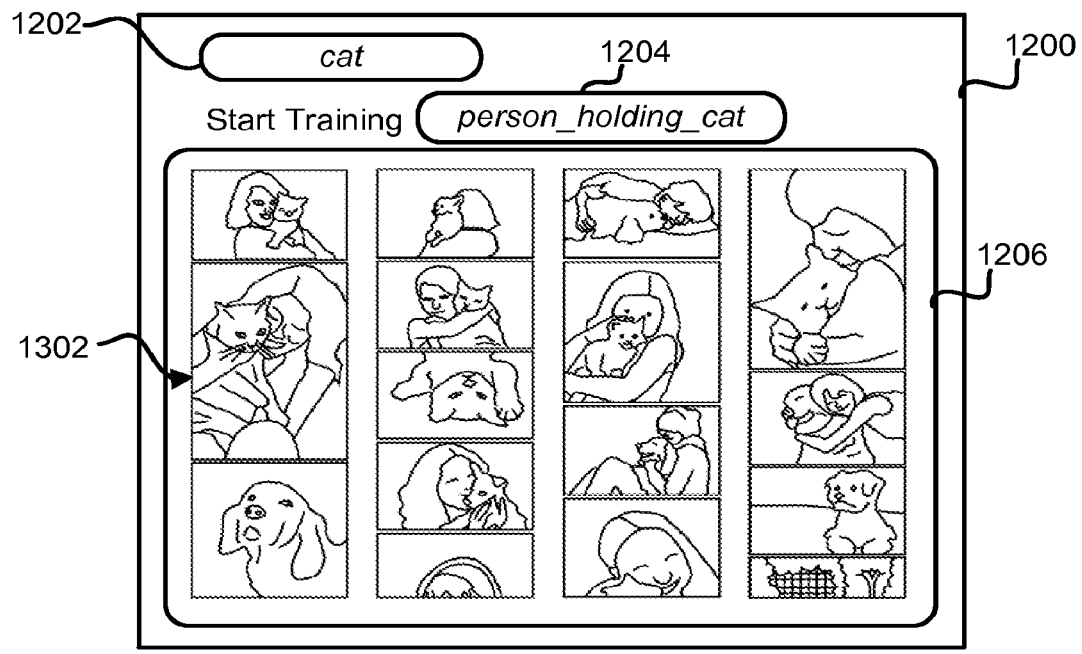
FIG. 13 illustrates another exemplary implementation of a user interface.

FIG. 13 illustrates an exemplary implementation of the user interface 1200 showing results from an updated search using the updated first query. Based on the updated first query, the first display element 1206 may be configured to display a second set 1302 of digital media items that satisfy the updated first query. Due to the further refinement of the first query based on the user selection, the second set 1302 includes digital media items that satisfy both "cat" and "person holding animal." As shown, the second set 1302 may include different images portraying people holding cats, and/or other images. The second set 1302 of digital media items may represent a user's desired search results when they may not have been entirely certain of search terms to use in an initial search. It is noted that the first query and/or updated first query may be iteratively refined based on one or more user selections of further digital media items shown in the display sets of digital media items.

The second input element 1204 may be configured to receive user entry of context information and/or other information. By way of non-limiting illustration, the user-entered context information is shows as "person_holding_cat," and/or other terms. The user-entered context information may facilitate updating context information associated with individual ones of the digital media items of the second set 1302. As such, the user-entered context information may be indexed for the individual ones of the digital media items of the second set 1302 and/or available as a new searchable term for digital media items.

It is noted that the digital media items in the second set 1302 of digital media item shown in FIG. 13 may not all comprise images of a person holding a cat. This may be due to errors during context information prediction for digital media items. As such, in some implementations, a user may continue to refine their search by selecting one or more digital media items in the second set 1302 such that one or more other sets of digital media items may be searched for based on further updated queries.

In some implementations, a refined query may be given a name and saved for future retrieval by using the name. For example, in the context of a consumer photo organization application, the user may search for "dog" with a text query, and then select one or more images of their own dog from the retrieved results, and save the query with the name of their dog "Molly". This may provide an online learning interface for training the system in real-time about new categories that are either specific to the given user (e.g., the name of their pet, "Molly") or general to many users. The saved query name and the example images chosen by the user may be stored by system 100. The saved query name may be aggregated over users to form new training data for the machine learning system, thereby growing the vocabulary of tags recognizable by the system.

Returning to FIG. 1, the server 102, external resources 122, digital media item repository 124, and/or computing platforms 126 may be operatively linked via one or more electronic communication links. For example, such electronic communication links may be established, at least in part, via a communication network 120 such as the Internet and/or other networks. It will be appreciated that this is not intended to be limiting, and that the scope of this disclosure includes implementations in which server 102, external resources 122, digital media item repository 124, and/or computing platforms 126 may be operatively linked via some other communication media.

The external resources 122 may include sources of information, hosts and/or providers of information outside of system 100, external entities participating with system 100, and/or other resources. In some implementations, some or all of the functionality attributed herein to external resources 122 may be provided by resources included in system 100 (e.g., in server 102).

The server 102 may include electronic storage 118, one or more processors 104, and/or other components. The server 102 may include communication lines or ports to enable the exchange of information with a network and/or other computing platforms 126. Illustration of server 102 in FIG. 1 is not intended to be limiting. The server 102 may include a plurality of hardware, software, and/or firmware components operating together to provide the functionality attributed herein to server 102.

Electronic storage 118 may comprise electronic storage media that electronically stores information. The electronic storage media of electronic storage 118 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor 104, information received from server 102, and/or other information that enables server 102 to function as described herein.

Processor(s) 104 may be configured to provide information processing capabilities in server 102. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more components. These components may be physically located within the same device, or processor 104 may represent processing functionality of a plurality of devices operating in coordination. The processor 104 may be configured to execute components 108, 110, 112, 114, and/or 116. Processor 104 may be configured to execute components 108, 110, 112, 114, and/or 116 by software; hardware; firmware; some combination of software, hardware, and/or firmware; and/or other mechanisms for configuring processing capabilities on processor 104.

It should be appreciated that, although components 108, 110, 112, 114, and/or 116 are illustrated in FIG. 1 as being co-located within a single component, in implementations in which processor 104 includes multiple components, one or more of components 108, 110, 112, 114, and/or 116 may be located remotely from the other components. The description of the functionality provided by the different components 108, 110, 112, 114, and/or 116 described above is for illustrative purposes and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 106, 108, 110, 112, 114, 116, and/or other components. As another example, processor 104 may be configured to execute one or more additional components that may perform some or all of the functionality attributed below to one or more of components 108, 110, 112, 114, and/or 116.

Figure 3:
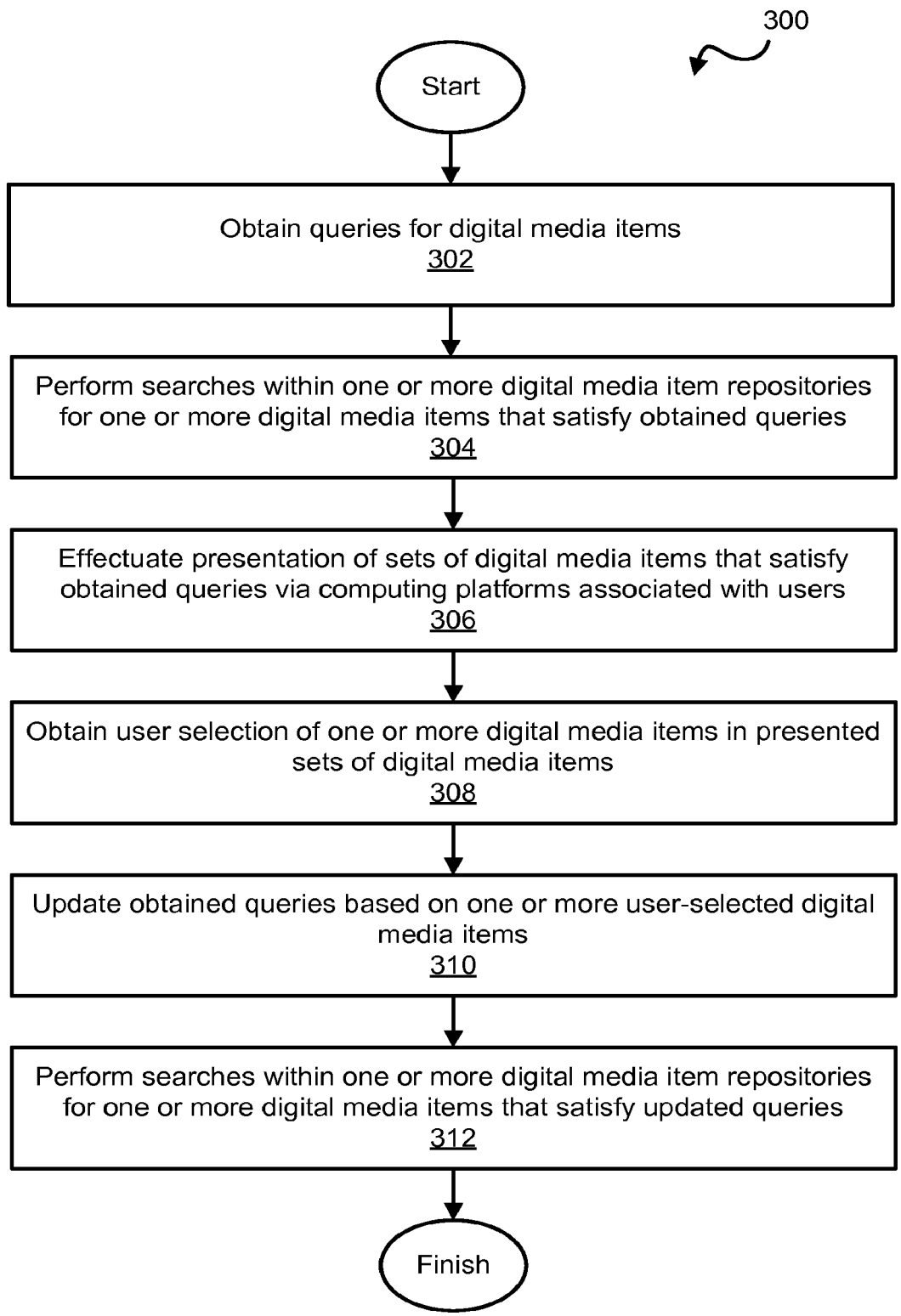
FIG. 3 illustrates a method for facilitating searching, labeling, and/or filtering of digital media items, in accordance with one or more implementations.

FIG. 3 illustrates a method 300 for facilitating searching, labeling, and/or filtering of digital media items, in accordance with one or more implementations. The operations of method 300 presented below are intended to be illustrative. In some embodiments, method 300 may be accomplished with one or more additional operations not described and/or without one or more of the operations discussed. Additionally, the order in which the operations of method 300 are illustrated in FIG. 5 and described below is not intended to be limiting.

In some embodiments, method 300 may be implemented in one or more processing devices (e.g., a digital processor, an analog processor, a digital circuit designed to process information, an analog circuit designed to process information, a state machine, a functionally limited processing device, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

Referring now to method 300 in FIG. 3, at an operation 302, one or more queries for digital media items may be obtained. By way of non-limiting example, a first query and/or other queries may be obtained. In some implementations, operation 302 may be performed by one or more physical processors executing a query component the same as or similar to query component 108 (shown in FIG. 1 and described herein).

At an operation 304, searches may be performed within one or more digital media item repositories for one or more digital media items that satisfy the obtained queries. By way of non-limiting example, a first search and/or other searches may be performed within a first digital media item repository and/or other digital media item repositories for one or more digital media items that satisfy the first query and/or other queries. In some implementations, operation 304 may be performed by one or more physical processors executing a search component the same as or similar to search component 110 (shown in FIG. 1 and described herein).

At an operation 306, presentation of sets of digital media items that satisfy the obtained queries may be effectuated via computing platforms associated with users. By way of non-limiting example, responsive to the first search returning a first set of digital media items that satisfy the first query, presentation of the first set of digital media items may be effectuated on a first computing platform. In some implementations, operation 306 may be performed by one or more physical processors executing a results component the same as or similar to results component 112 (shown in FIG. 1 and described herein).

At an operation 308, user selection of one or more digital media items in the presented sets of digital media items may be obtained. By way of non-limiting example, A first user selection may be obtained. The first user selection may comprise a selection by a first user via the first computing platform of a first digital media item included in the first set of digital media items. In some implementations, operation 308 may be performed by one or more physical processors executing a selection component the same as or similar to selection component 114 (shown in FIG. 1 and described herein).

At an operation 310, one or more queries for digital media items may be updated based on one or more user-selected digital media items. By way of non-limiting example, the first query may be updated based on the first digital media item. In some implementations, operation 310 may be performed by one or more physical processors executing a query component the same as or similar to query component 108 (shown in FIG. 1 and described herein).

At an operation 312, searches may be performed within one or more digital media item repositories for one or more digital media items that satisfy updated queries. By way of non-limiting example, a second search and/or other searches may be performed within a first digital media item repository and/or other digital media item repositories for one or more digital media items that satisfy the updated first query and/or other updated queries. In some implementations, operation 312 may be performed by one or more physical processors executing a search component the same as or similar to search component 110 (shown in FIG. 1 and described herein).

Although the present technology has been described in detail for the purpose of illustration based on what is currently considered to be the most practical and preferred implementation, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating media item search and machine learning system training, the system comprising:
 a computer system comprising one or more processors programmed with computer program instructions that, when executed, cause the computer system to:
 obtain a first set of media items based on performance of a query related to one or more search parameters;
 cause the first set of media items to be presented on a user interface;
 obtain, via the user interface, a user selection of a media item of the first set of media items;
 update the query based on (i) the user-selected media item and (ii) the one or more search parameters;
 obtain a second set of media items based on performance of the updated query;
 assign media items of the second set of media items to a group based on similarities of the media items of the second set to one another;
 determine, via a visual-semantic embedding space of a machine learning system, a predicted name for the group based on information associated with media items in the group;
 cause the predicted name to be presented on the user interface;
 obtain, via the user interface, a user-indicated update to the predicted name for the group subsequent to the predicted name being presented on the user interface; and
 provide the user-indicated update and the user-selected media item to the machine learning system to cause the machine learning system to be trained based on the user-indicated update and the user-selected media item, the training comprising updating the visual-semantic embedding space of the machine learning system based on the user-indicated update and the user-selected media item.

2. The system of claim 1, wherein updating the query comprises:
 obtaining, via the machine learning system, context information associated with the user-selected media item, wherein at least some of the obtained context information is predicted by the machine learning system; and updating the query based on (i) the context information and (ii) the one or more search parameters.

3. The system of claim 1, wherein the computer system is caused to:
obtain, from a user device, a search request for one or more media items, the search request comprising the one or more search parameters; and
cause, based on the search request, the query to be performed on a media item repository at the user device.

4. The system of claim 3, wherein the computer system is caused to:
cause the updated query to be performed on the media item repository at the user device.

5. The system of claim 1, wherein the first set of media items are mapped to points in the visual-semantic embedding space, wherein the computer system is caused to:
assign media items of the first set of media items to a first group based on similarities of the media items of the first set to one another; and
cause the first set of media items to be presented on a user interface such that (i) a central media item of the first group mapped to a most central representative point in the visual-semantic embedding space associated with the first group is presented in a position of priority, the position of priority being proximate to a center of the user interface and (ii) other media items of the first group are presented around the central media item.

6. The system of claim 5, wherein the computer system is caused to:
initially present each of the media items of the first group overlaid over one another in a stack arrangement view; and
responsive to a user controlling a cursor over the stack arrangement view, cause the stack arrangement view to be changed such that the central media item of the first group is presented in the position of priority and the other media items of the first group are presented around a periphery of the central media item.

7. The system of claim 5, wherein the central media item of the first group is portrayed larger relative to the other media items of the first group.

8. The system of claim 5, wherein the second set of media items are mapped to points in the visual-semantic embedding space, and wherein the media items of a second group are presented on the user interface such that (i) a second central media item of the second group mapped to a most central representative point in the visual-semantic embedding space associated with the second group is presented in the position of priority, and (ii) other media items of the second group are presented around the second central media item.

9. A method implemented by one or more processors executing computer program instructions that, when executed, perform the method, the method comprising:
obtaining a first set of media items based on performance of a query related to one or more search parameters;
causing the first set of media items to be presented on a user interface;
obtaining, via the user interface, a user selection of a media item of the first set of media items;
updating the query based on (i) the user-selected media item and (ii) the one or more search parameters;
obtaining a second set of media items based on performance of the updated query;
assigning media items of the second set of media items to a group based on similarities of the media items of the second set to one another;
determining, via a visual-semantic embedding space of a machine learning system, a predicted name for the group based on information associated with media items in the second group;
causing the predicted name to be presented on the user interface;
obtaining, via the user interface, a user-indicated update to the predicted name for the group subsequent to the predicted name being presented on the user interface; and
providing the user-indicated update and the user-selected media item to the machine learning system to cause the machine learning system to be trained based on the user-indicated update and the user-selected media item, the training comprising updating the visual-semantic embedding space of the machine learning system based on the user-indicated update and the user-selected media item.

10. The method of claim 9, wherein updating the query comprises:
obtaining context information associated with the user-selected media item; and
updating the query based on (i) the context information and (ii) the one or more search parameters.

11. The method of claim 9, further comprising:
obtaining, from a user device, a search request for one or more media items, the search request comprising the one or more search parameters; and
causing, based on the search request, the query to be performed on a media item repository at the user device.

12. The method of claim 11, further comprising:
causing the updated query to be performed on the media item repository at the user device.

13. The method of claim 9, wherein the first set of media items are mapped to points in the visual-semantic embedding space, the method further comprising:
assigning media items of the first set of media items to a first group based on similarities of the media items of the first set to one another; and
causing the first set of media items to be presented on a user interface such that (i) a central media item of the first group mapped to a most central representative point in the visual-semantic embedding space associated with the first group is presented in a position of priority, the position of priority being proximate to a center of the user interface and (ii) other media items of the first group are presented around the central media item.

14. The method of claim 13, further comprising:
initially presenting each of the media items of the first group overlaid over one another in a stack arrangement view; and
responsive to a user controlling a cursor over the stack arrangement view, causing the stack arrangement view to be changed such that the central media item of the first group is presented in the position of priority and the other media items of the first group are presented around a periphery of the central media item.

15. The method of claim 13, wherein the central media item of the first group is portrayed larger relative to the other media items of the first group.

16. The method of claim 13, wherein the second set of media items are mapped to points in the visual-semantic embedding space, and wherein the media items of a second group are presented on the user interface such that (i) a second central media item of the second group mapped to a most central representative point in the visual-semantic embedding space associated with the second group is presented in the position of priority, and (ii) other media items of the second group are presented around the second central media item.

17. One or more non-transitory machine-readable media storing instructions that, when executed by one or more processors of a computer system, cause the computer system to perform operations comprising:

obtaining a first set of media items based on performance of a query related to one or more search parameters;

causing the first set of media items to be presented on a user interface;

obtaining, via the user interface, a user selection of a media item of the first set of media items;

updating the query based on (i) the user-selected media item and (ii) the one or more search parameters;

obtaining a second set of media items based on performance of the updated query;

assigning media items of the second set of media items to a group based on similarities of the media items of the second set to one another;

determining, via a visual-semantic embedding space of a machine learning system, a predicted name for the group based on information associated with media items in the second group;

causing the predicted name to be presented on the user interface;

obtaining, via the user interface, a user-indicated update to the predicted name for the group subsequent to the predicted name being presented on the user interface; and providing the user-indicated update and the user-selected media item to the machine learning system to cause the machine learning system to be trained based on the user-indicated update and the user-selected media item, the training comprising updating the visual-semantic embedding space of the machine learning system based on the user-indicated update and the user-selected media item.

18. The non-transitory machine-readable media of claim 17, wherein updating the query comprises:

obtaining context information associated with the user-selected media item; and updating the query based on (i) the context information and (ii) the one or more search parameters.

19. The non-transitory machine-readable media of claim 17, the operations further comprising:

obtaining, from a user device, a search request for one or more media items, the search request comprising the one or more search parameters; and causing, based on the search request, the query to be performed on a media item repository at the user device.

20. The non-transitory machine-readable media of claim 19, the operations further comprising:

causing the updated query to be performed on the media item repository at the user device.

* * * * *